(12) United States Patent
Cho

(10) Patent No.: US 10,474,348 B2
(45) Date of Patent: Nov. 12, 2019

(54) MOBILE TERMINAL CAPABLE OF EFFECTIVELY MANAGING CONTENTS BY SELECTING THOSE CONTENTS IN DIFFERENT MANNER AND CONTROL METHOD THEREOF

(71) Applicant: LG ELECTRONICS INC., Seoul (KR)

(72) Inventor: Hyunjung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 15/506,661

(22) PCT Filed: Nov. 24, 2014

(86) PCT No.: PCT/KR2014/011317
§ 371 (c)(1),
(2) Date: Feb. 24, 2017

(87) PCT Pub. No.: WO2016/032062
PCT Pub. Date: Mar. 3, 2016

(65) Prior Publication Data
US 2017/0277386 A1    Sep. 28, 2017

(30) Foreign Application Priority Data

Aug. 25, 2014  (KR) .......... 10-2014-0110884

(51) Int. Cl.
*G06F 17/00*   (2019.01)
*G06F 3/0488*  (2013.01)
*G06F 16/54*   (2019.01)
*H04B 1/40*    (2015.01)
*G06F 3/0481*  (2013.01)
*G06F 3/0482*  (2013.01)
*G06F 16/00*   (2019.01)

(52) U.S. Cl.
CPC .......... *G06F 3/0488* (2013.01); *G06F 3/0482* (2013.01); *G06F 3/04817* (2013.01); *G06F 16/00* (2019.01); *G06F 16/54* (2019.01); *H04B 1/40* (2013.01)

(58) Field of Classification Search
None
See application file for complete search history.

(56) References Cited

U.S. PATENT DOCUMENTS

2008/0162545 A1 *  7/2008  Austin ............. G06F 17/30067
2008/0184285 A1    7/2008  Park et al.
(Continued)

FOREIGN PATENT DOCUMENTS

EP    2 631 762 A1    8/2013
KR    10-2011-0103228 A    9/2011

*Primary Examiner* — Mustafa A Amin
(74) *Attorney, Agent, or Firm* — Birch, Stewart, Kolasch & Birch, LLP

(57) ABSTRACT

A mobile terminal capable of effectively managing contents including a display displaying a plurality of contents, and a controller controlling the display to display a first identifier on a first content among the plurality of contents, the first identifier indicating that the first content has been selected, and to display a second identifier on a second content among the plurality of contents, the second identifier indicating that the second content has been selected in a different manner from the first content.

16 Claims, 20 Drawing Sheets

(56) References Cited

U.S. PATENT DOCUMENTS

| | | | |
|---|---|---|---|
| 2009/0125476 A1* | 5/2009 | Jager | G06F 3/0482 |
| 2010/0070842 A1* | 3/2010 | Aymeloglu | G06F 17/2288 |
| | | | 715/207 |
| 2010/0097494 A1* | 4/2010 | Gum | G01S 19/14 |
| | | | 348/231.5 |
| 2011/0161853 A1* | 6/2011 | Park | G06F 3/0486 |
| | | | 715/769 |
| 2013/0127749 A1* | 5/2013 | Yamamoto | G06F 3/0488 |
| | | | 345/173 |
| 2013/0222435 A1 | 8/2013 | Choi et al. | |
| 2014/0026104 A1* | 1/2014 | Tokita | G06F 3/04817 |
| | | | 715/854 |
| 2014/0331173 A1* | 11/2014 | Minekawa | G02B 21/365 |
| | | | 715/803 |
| 2016/0100065 A1* | 4/2016 | Osajima | H04N 1/0097 |
| | | | 358/1.16 |

\* cited by examiner

[Fig. 1a]
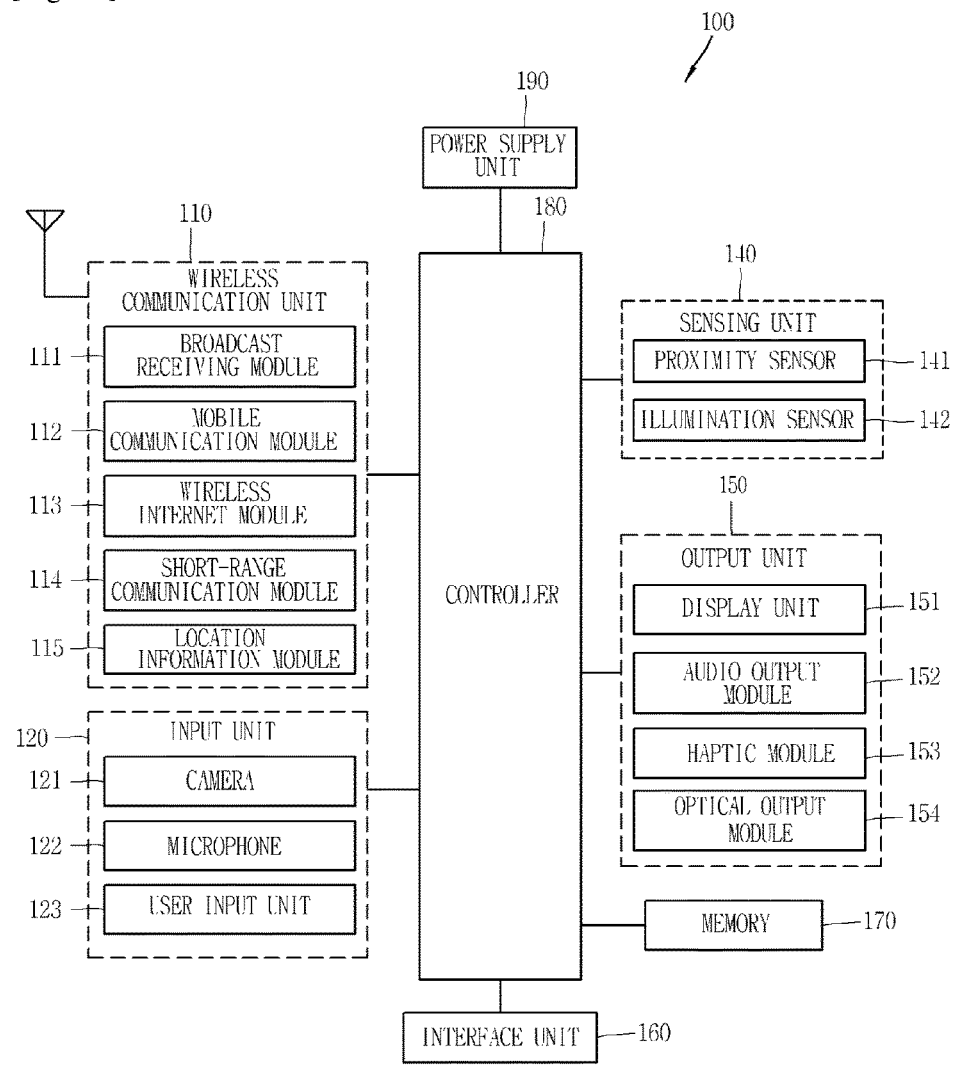
[Fig. 1b]
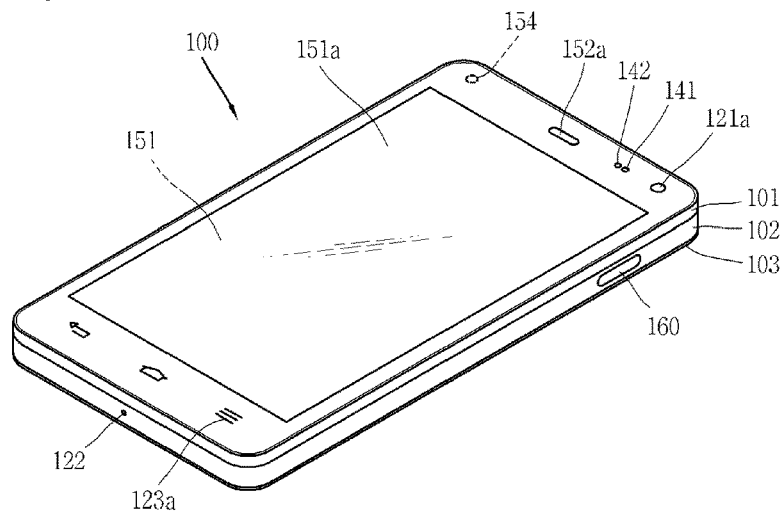

[Fig. 1c]
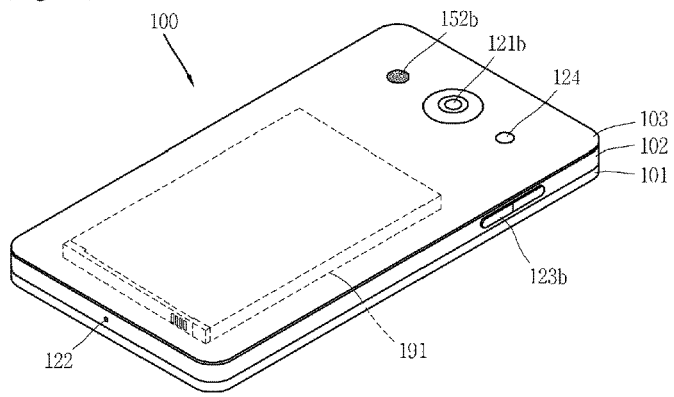
[Fig. 2]
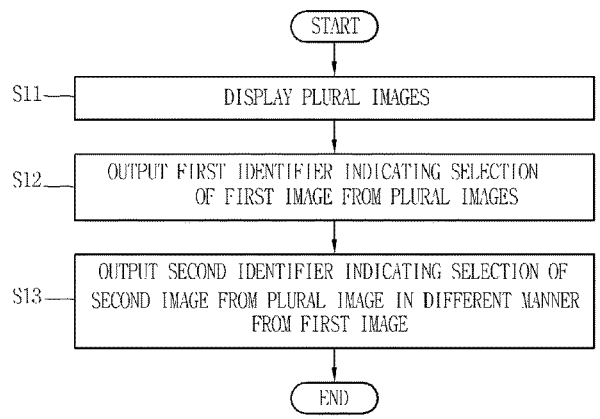
[Fig. 3]
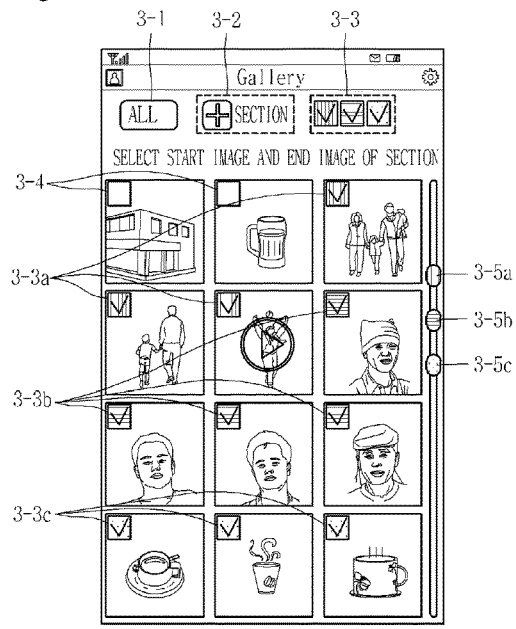

[Fig. 4a]
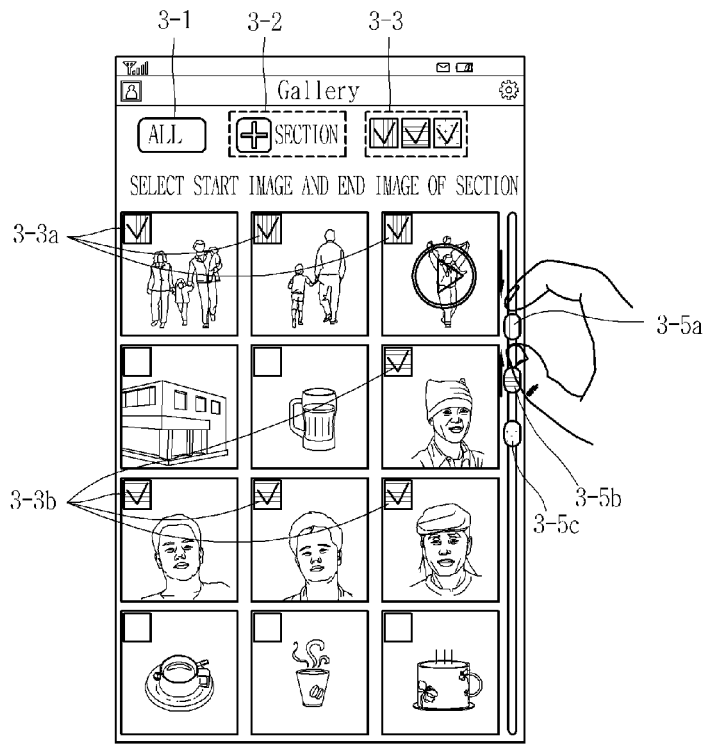
[Fig. 4b]
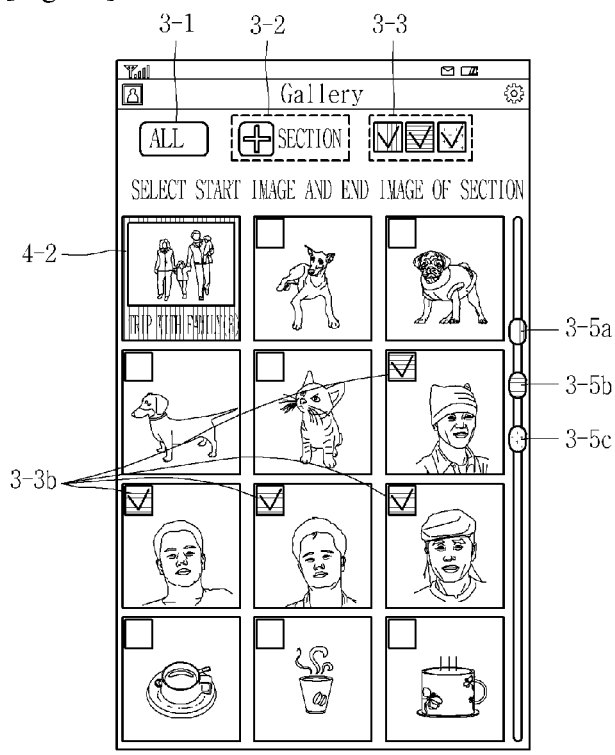

[Fig. 5a]
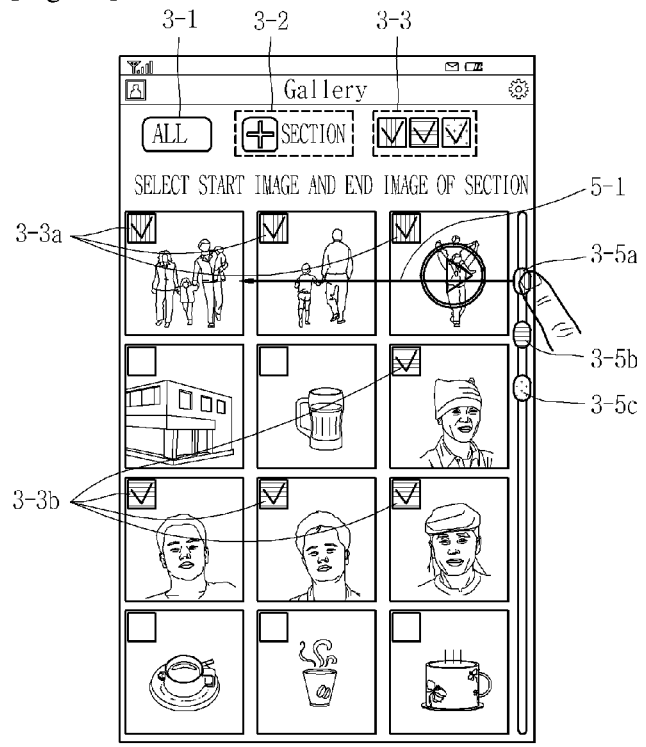
[Fig. 5b]
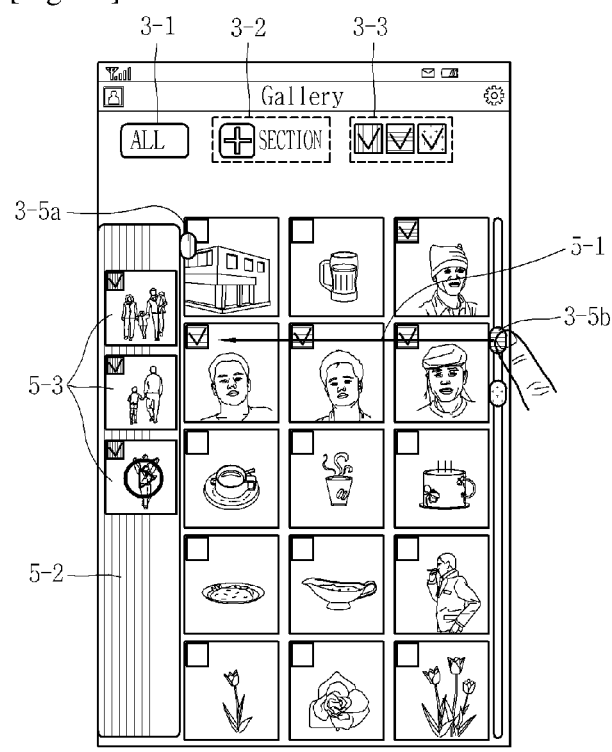

[Fig. 5c]
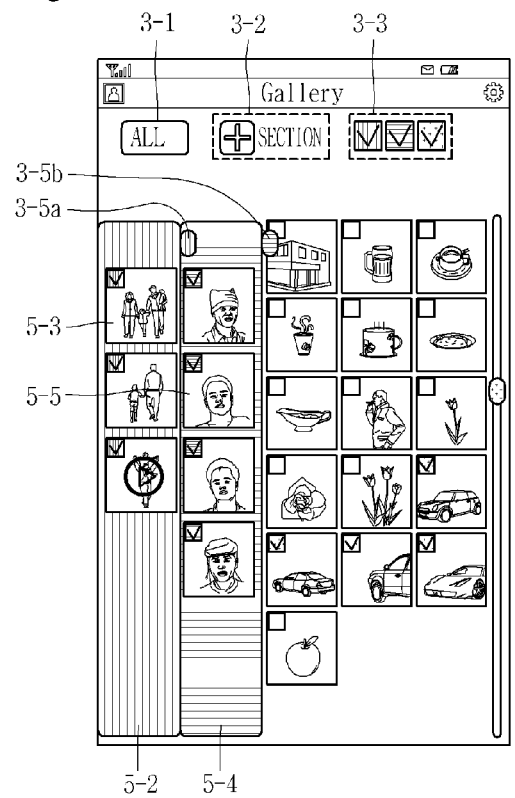
[Fig. 6a]
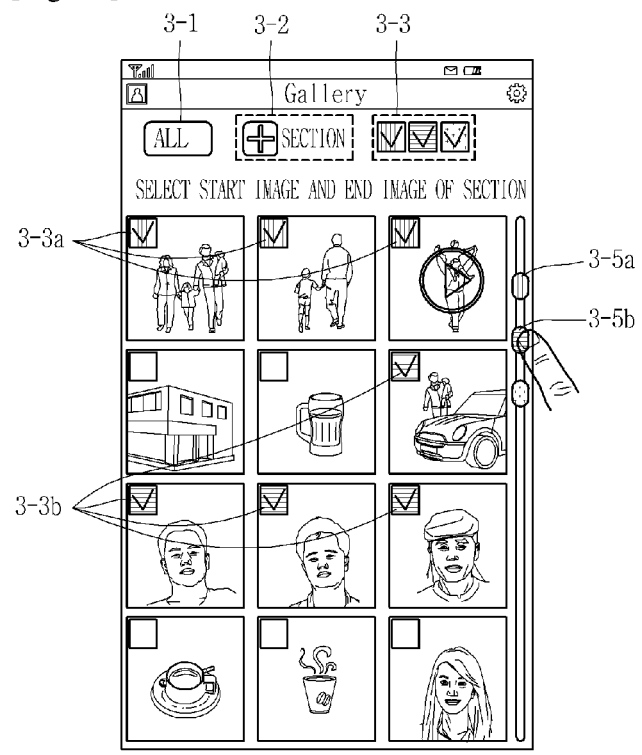

[Fig. 6b]
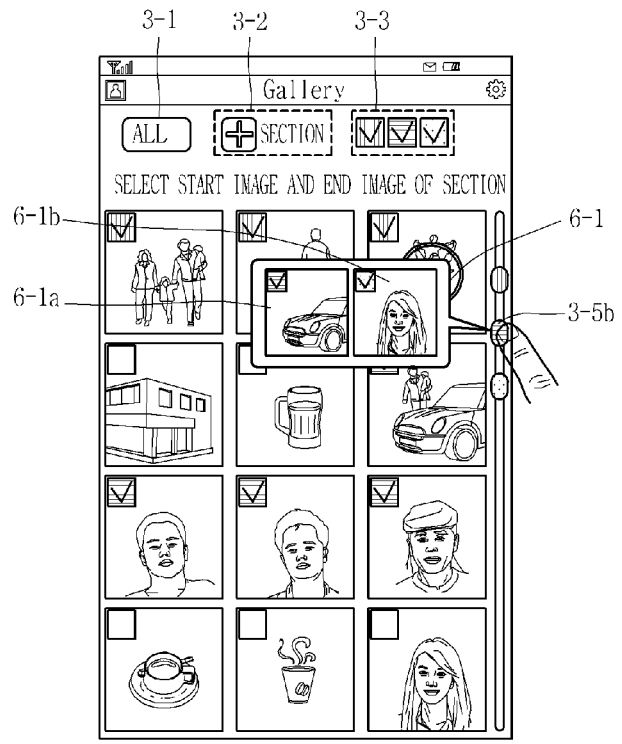
[Fig. 7a]
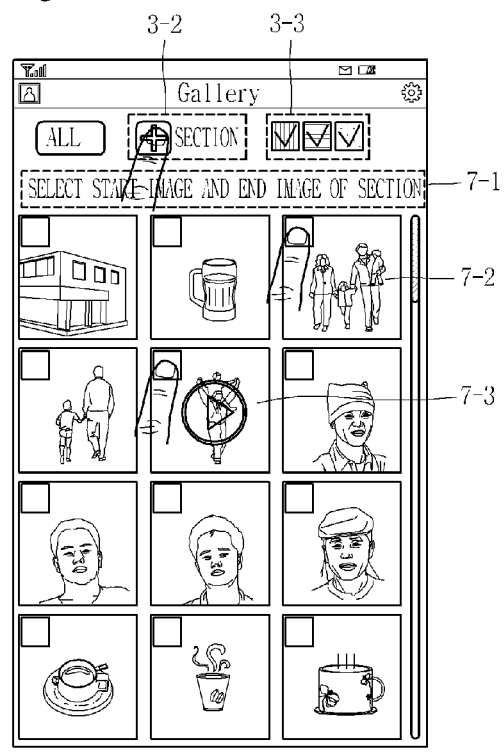

[Fig. 7b]
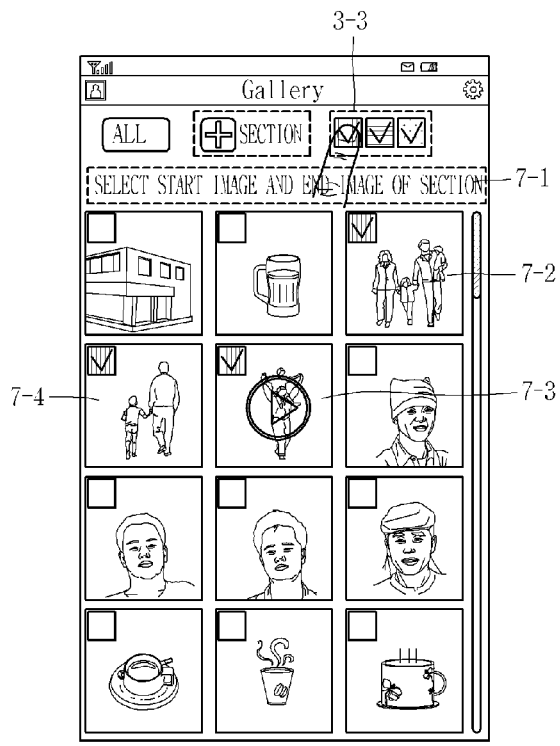
[Fig. 8a]
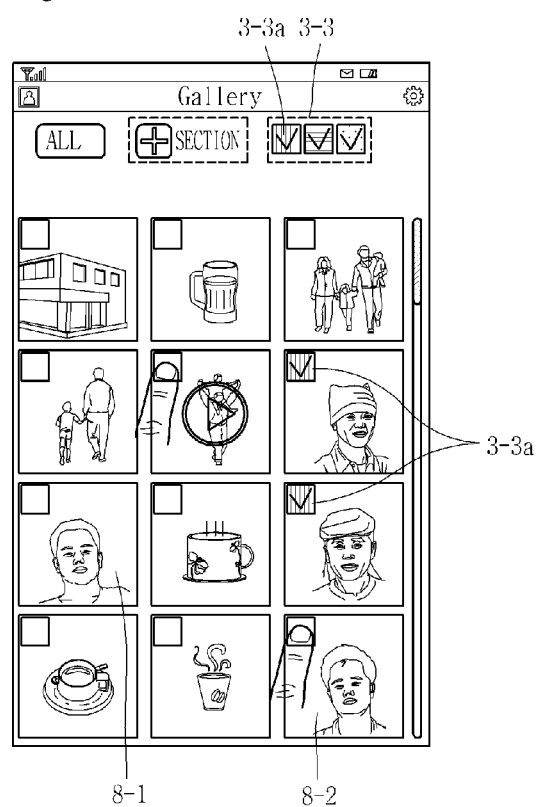

[Fig. 8b]
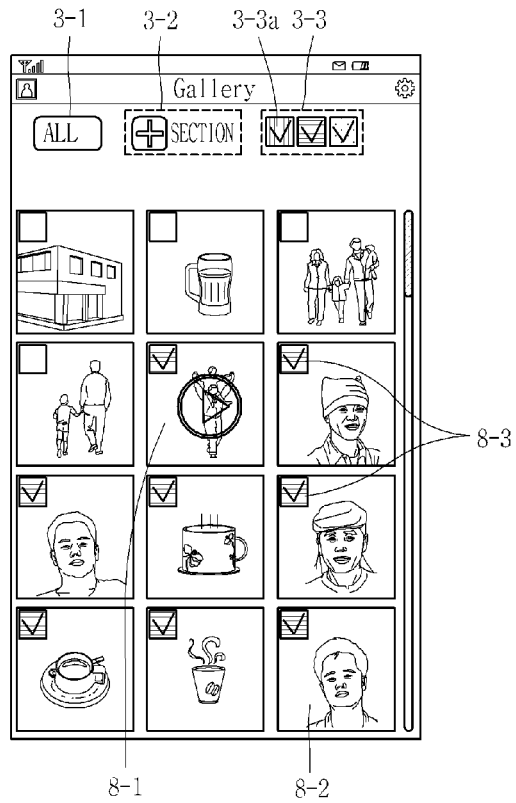
[Fig. 9]
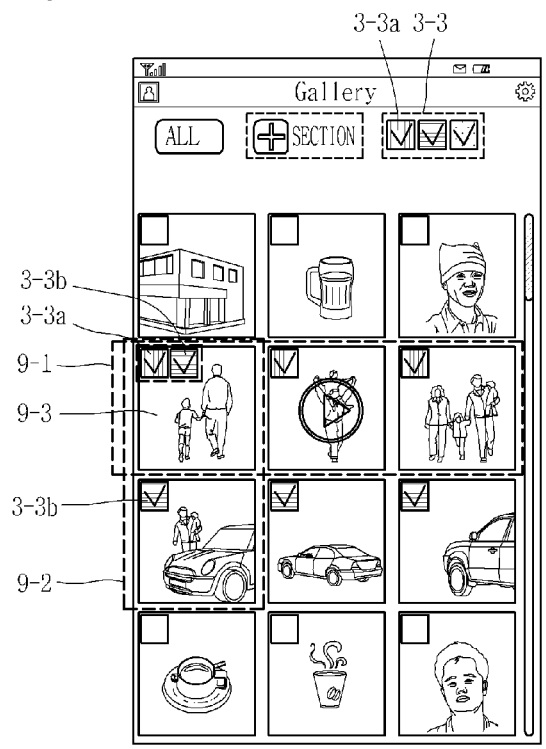

[Fig. 10a]
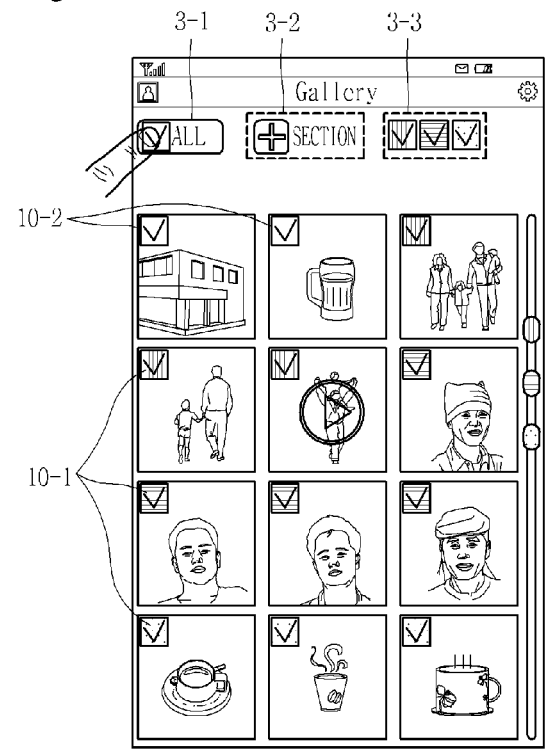
[Fig. 10b]
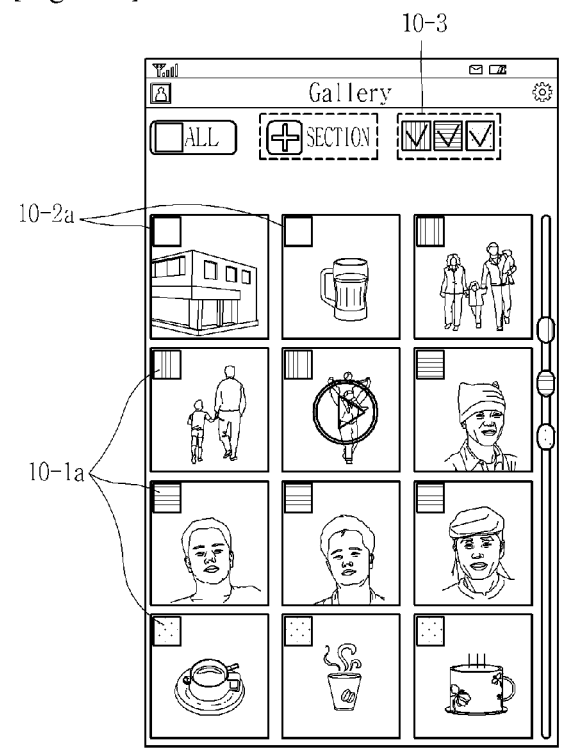

[Fig. 11a]
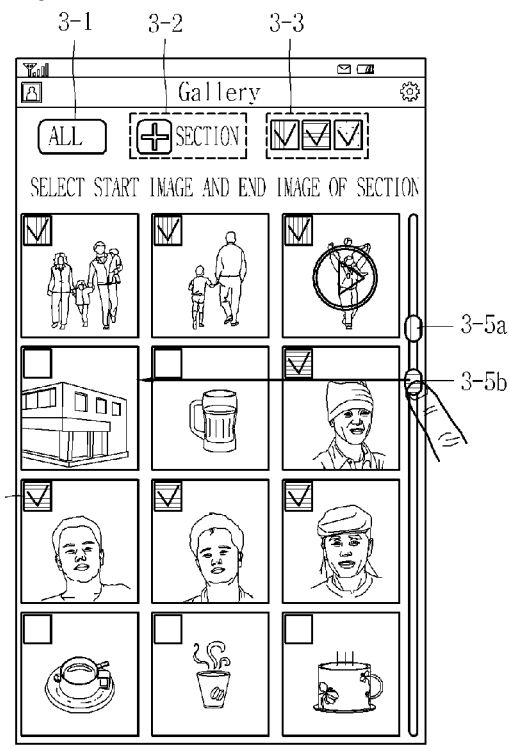
[Fig. 11b]
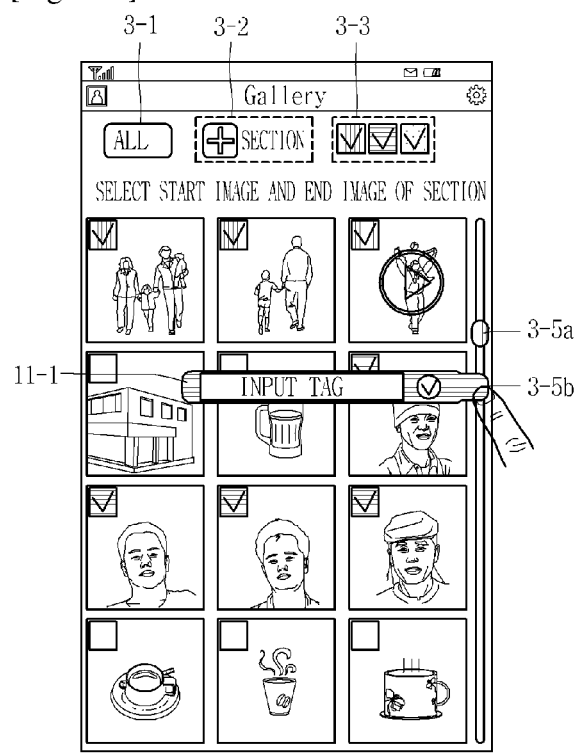

[Fig. 11c]
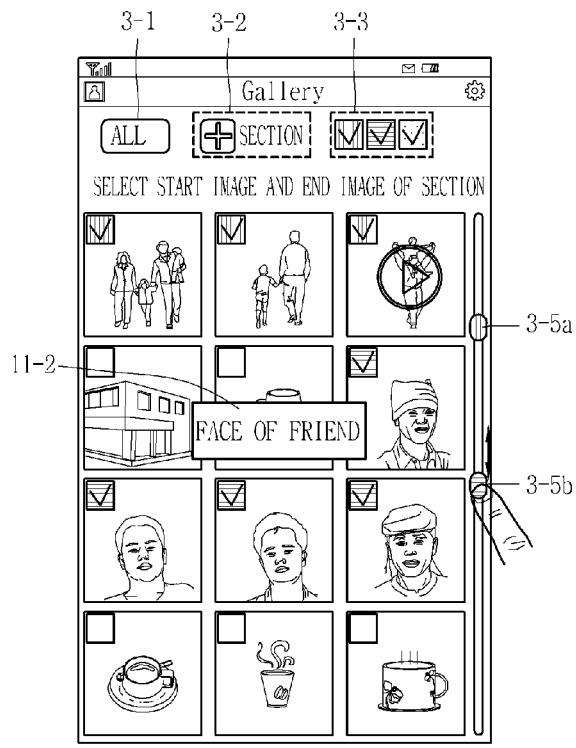
[Fig. 12a]
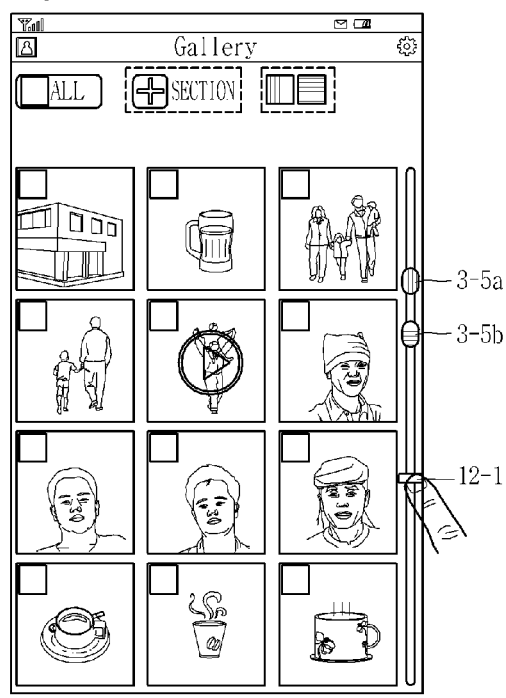

[Fig. 12b]
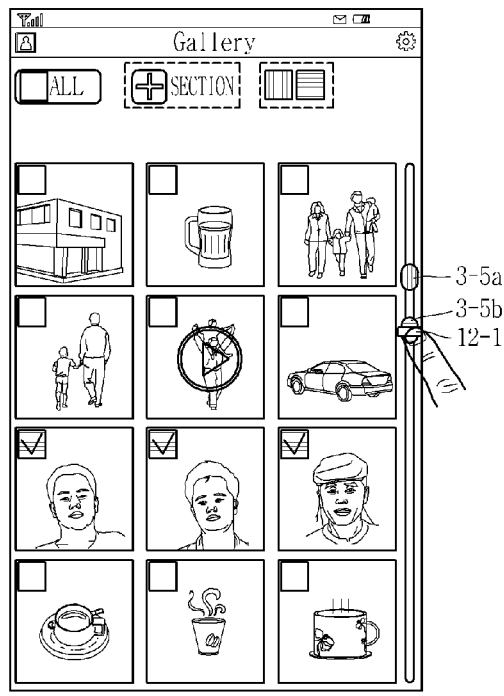
[Fig. 12c]
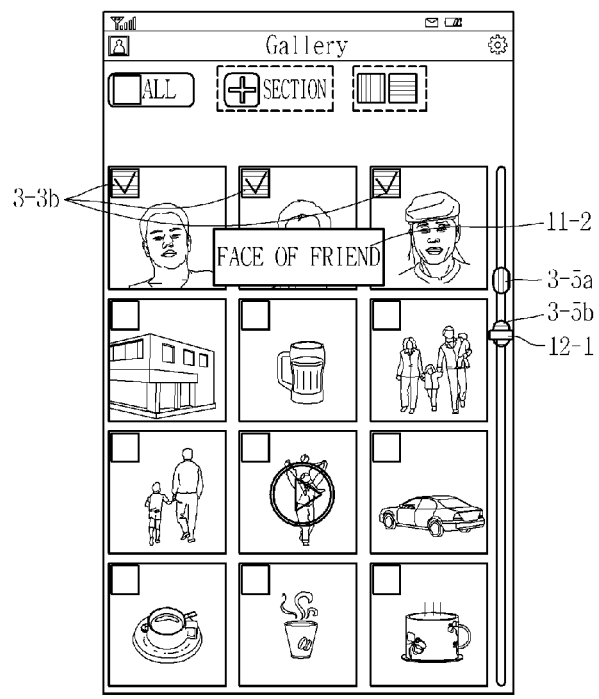

[Fig. 13a]
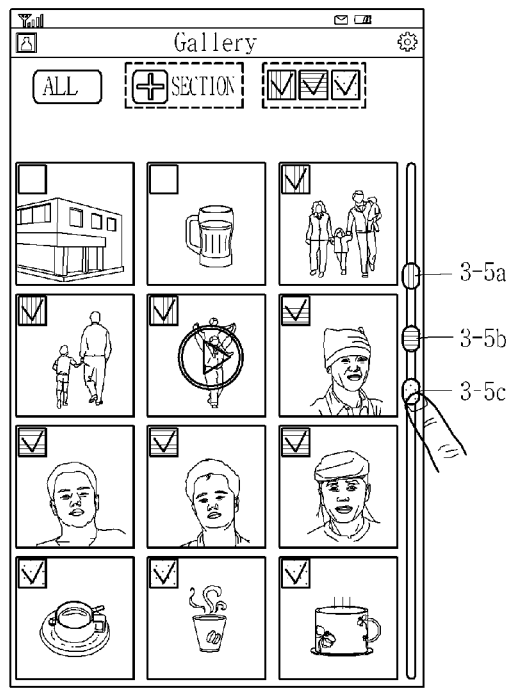
[Fig. 13b]
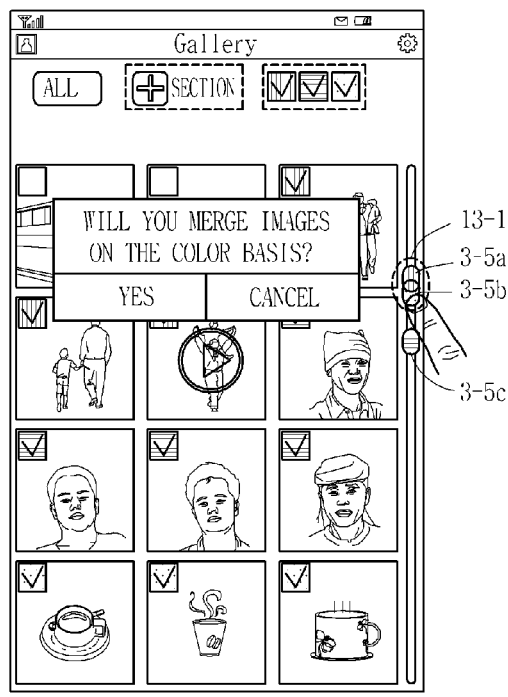

[Fig. 14a]
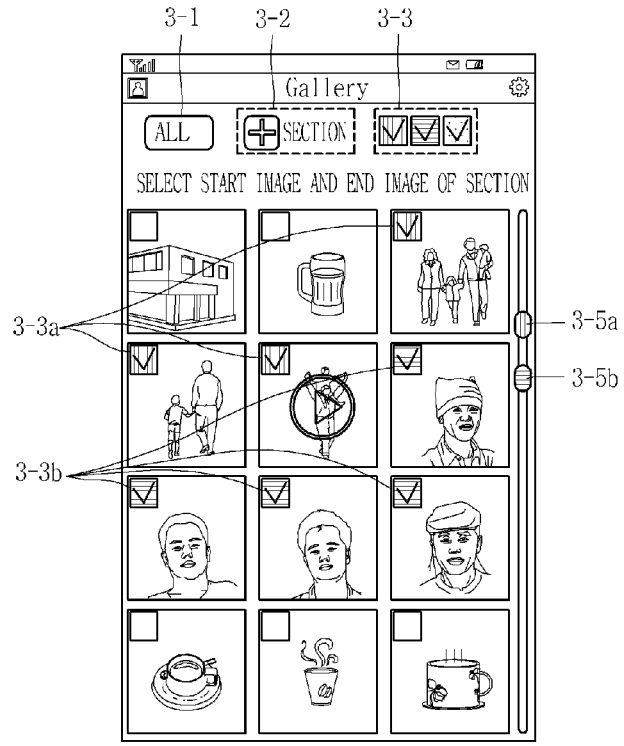
[Fig. 14b]
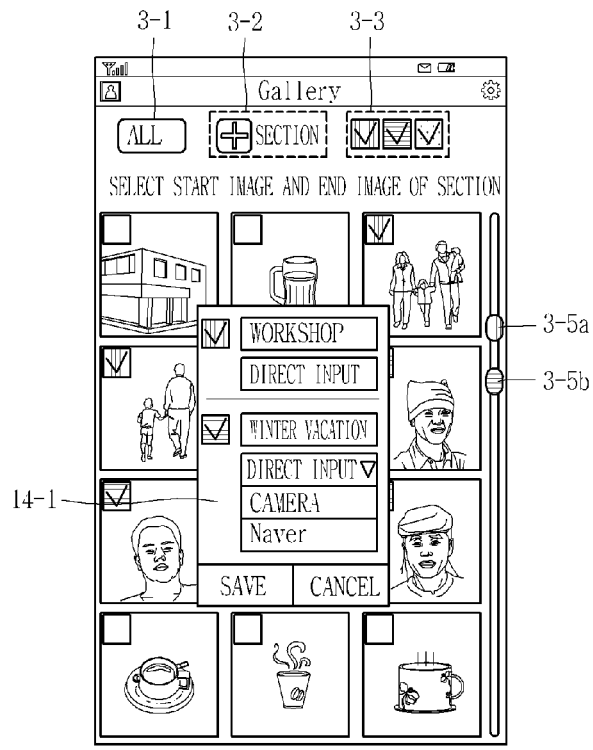

[Fig. 14c]
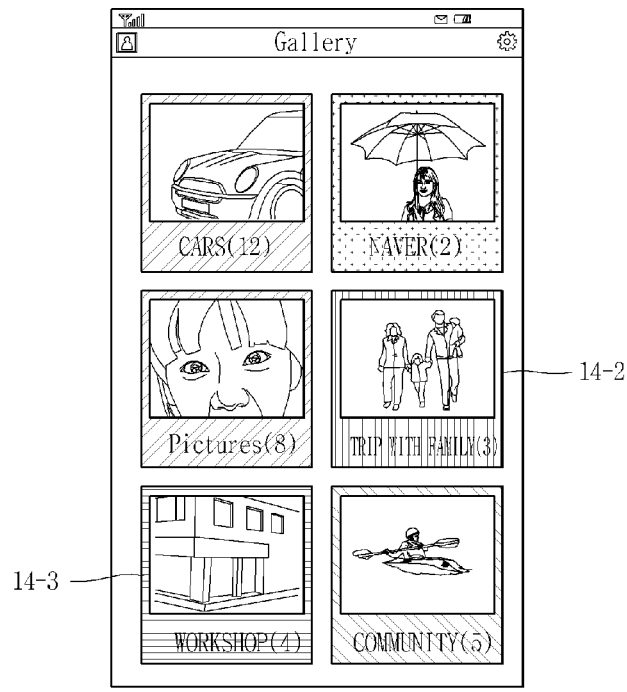
[Fig. 15a]
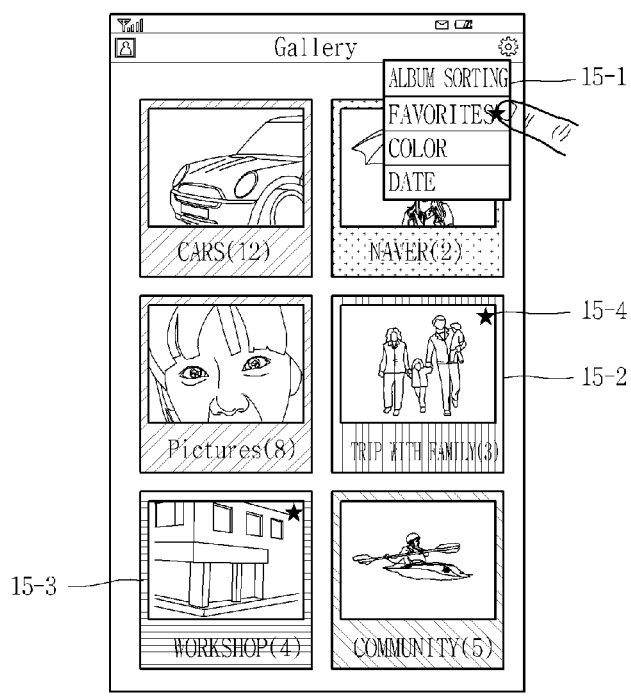

[Fig. 15b]
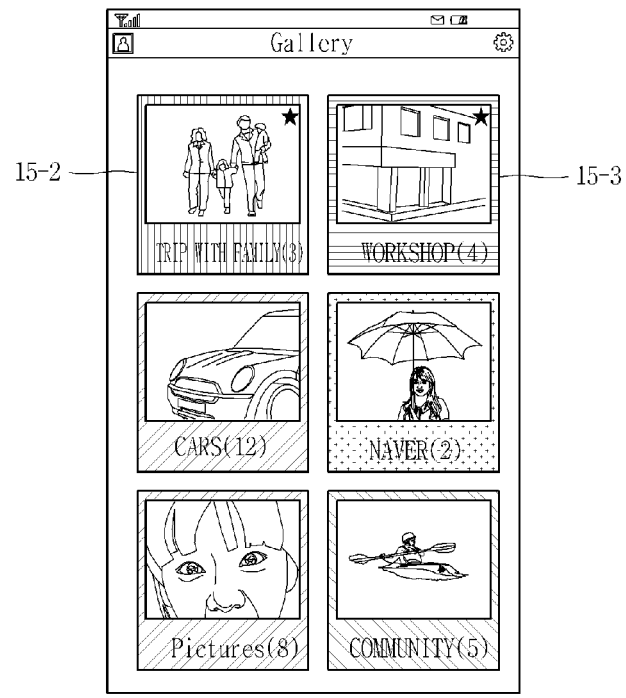
[Fig. 16a]
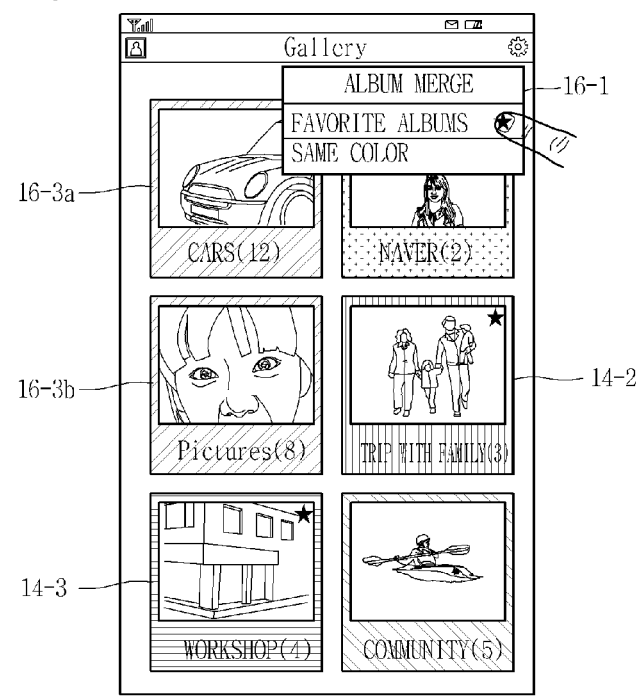

[Fig. 16b]
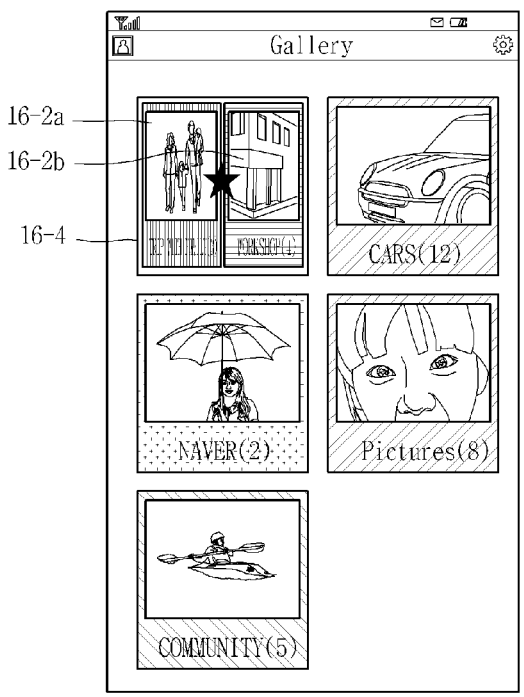
[Fig. 16c]
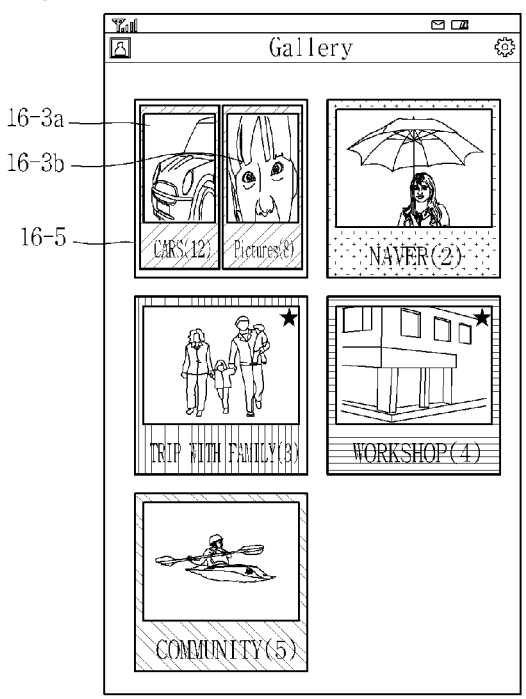

[Fig. 17a]
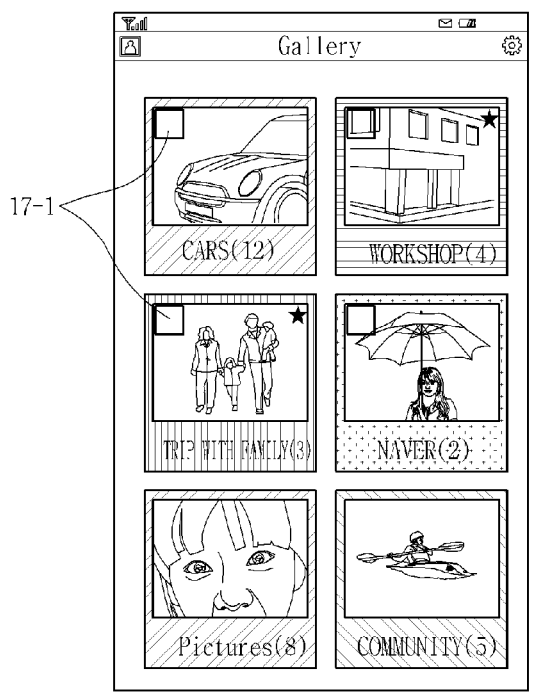
[Fig. 17b]
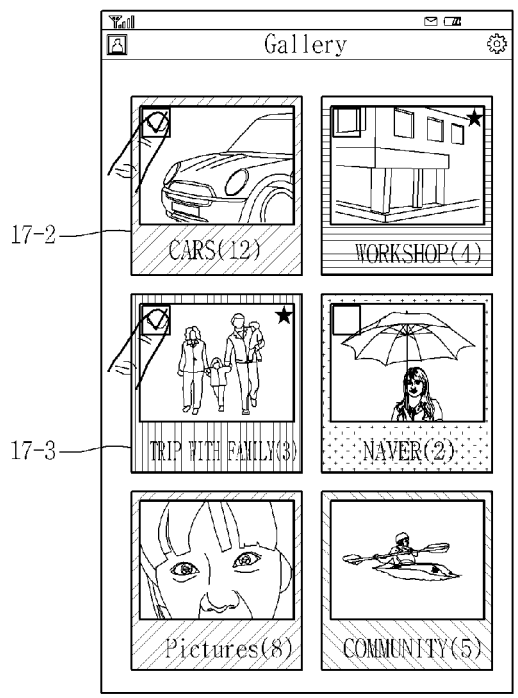

[Fig. 17c]
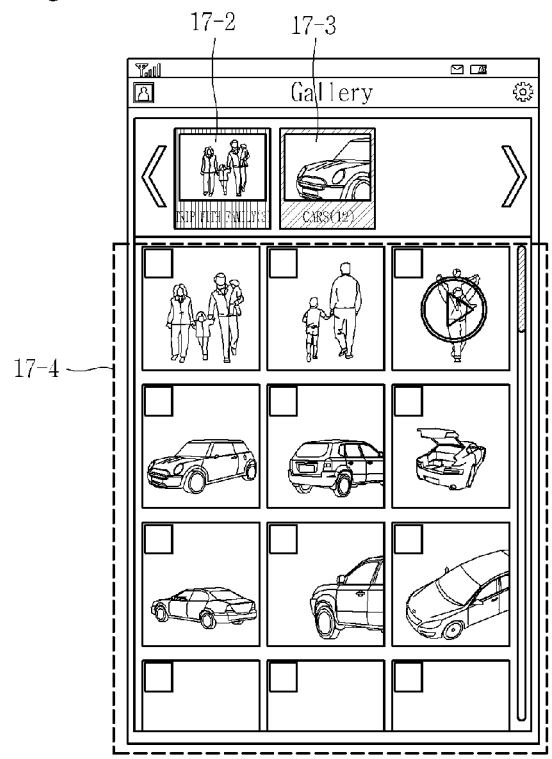
[Fig. 18a]
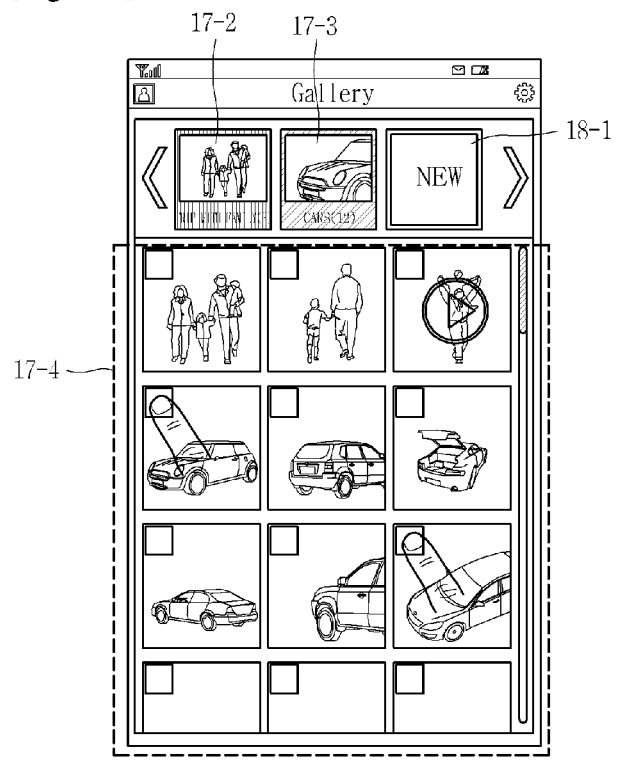

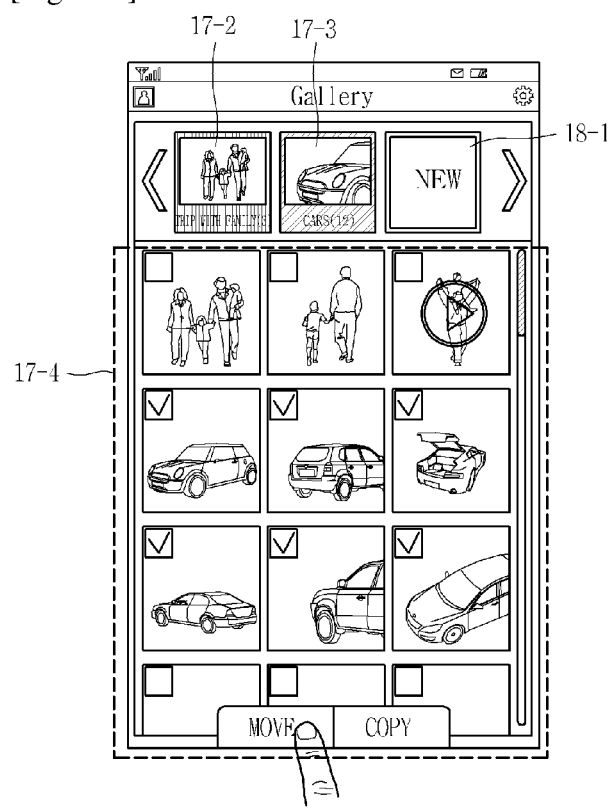
[Fig. 18b]

MOBILE TERMINAL CAPABLE OF EFFECTIVELY MANAGING CONTENTS BY SELECTING THOSE CONTENTS IN DIFFERENT MANNER AND CONTROL METHOD THEREOF

CROSS REFERENCE TO RELATED APPLICATIONS

This application is the National Phase of PCT International Application No. PCT/KR2014/011317, filed on Nov. 24, 2014, which claims priority under 35 U.S.C. 119(a) to Patent Application No. 10-2014-0110884, filed in Republic of Korea on Aug. 25, 2014, all of which are hereby expressly incorporated by reference into the present application.

TECHNICAL FIELD

The present disclosure relates to a mobile terminal and a control method thereof.

BACKGROUND ART

In general, mobile terminals (or portable terminals) are portable devices which are portable and perform various functions, for example, voice and video call communication, information input/output, data storage and the like. Also, mobile terminals have become increasingly more functional. Examples of such functions include capturing images and video, playing back music or video files, playing games, receiving broadcast programs, so as to be implemented as an integrated multimedia player.

DISCLOSURE OF INVENTION

Solution to Problem

Therefore, an aspect of the detailed description is to provide a mobile terminal capable of effectively managing (for example, moving, copying, editing, grouping, etc.) contents by selecting those contents in different manners, and a control method thereof.

To achieve these and other advantages and in accordance with the purpose of the present invention, as embodied and broadly described herein, there is provided a mobile terminal, including a display unit that is configured to display a plurality of contents, and a controller that is configured to display a first identifier on a first content among the plurality of contents, the first identifier indicating that the first content has been selected, and display a second identifier on a second content among the plurality of contents, the second identifier indicating that the second content has been selected in a different manner from the first content.

In accordance with one embodiment of the present disclosure, the first and second identifiers may be checkboxes having different colors or shapes, and the plurality of contents may be a plurality of images.

In accordance with one embodiment of the present disclosure, the controller may output on a first image a first checkbox with a first color which indicates that the first image has been selected from the plurality of images, and output on a second image a second checkbox with a second color which indicates that the second image has been selected from the plurality of images in a different manner from the first image. Here, the first and second colors may be different from each other.

In accordance with one embodiment of the present disclosure, the controller may output the first identifier on all the images within a first section when the first section is designated. The first section may be designated for selecting an image from the plurality of images. Also, the controller may output the second identifier on all the images within a second section when the second section is designated. The second section may be designated for selecting an image from the plurality of images.

In accordance with one embodiment of the present disclosure, the controller may output a third identifier on all the images within a third section when the third section is designated. Here, the third section may include a part of the first section or a part of the second section. The first to third identifiers may have different colors from one another.

In accordance with one embodiment of the present disclosure, the controller may output both the first identifier and the second identifier on a specific image included in both of the first section and the second section.

In accordance with one embodiment of the present disclosure, the controller may output, along with the plurality of images, on the display unit, a first icon for selecting all of the plurality of images or releasing all of the plurality of images selected, a second icon for designating a plurality of sections for selecting images from the plurality of images, and a third icon for outputting identifiers indicating that all the images within the first section and all the images within the second section of the plurality of sections have been selected in different manners from each other.

In accordance with one embodiment of the present disclosure, the controller may output a first index bar that controls the first image having the first identifier, and a second index bar that controls the second image having the second identifier.

In accordance with one embodiment of the present disclosure, the controller may execute one of grouping, setting as a hidden file, copying, moving, outputting on an edit window and sorting, with respect to a plurality of images each having the first identifier when a first touch input is applied to the first index bar.

In accordance with one embodiment of the present disclosure, the controller may simultaneously release the selection of a plurality of images each having the first identifier when a first touch input is applied to the first index bar.

In accordance with one embodiment of the present disclosure, the controller may search for images belonging to a category, different from a category of images having the first identifier, among images with the first identifier, and then propose to change the first identifier output on the searched images, when a first touch input is applied to the first index bar.

In accordance with one embodiment of the present disclosure, the controller may search for images belonging to the same category as a category of images having the first identifier, among images with the second identifier and then propose to change the second identifier output on the searched images to the first identifier, when the first touch input is applied to the first index bar.

In accordance with one embodiment of the present disclosure, the controller may output a tag input window for inputting a tag to all the images having the first identifier on the display unit when a preset touch input is applied to the first index bar, and then automatically input the input tag to all the images with the first identifier when the tag is input onto the tag input window.

In accordance with one embodiment of the present disclosure, the controller may output a control bar for controlling the first and second index bars on the display unit, and sort all the images each having the first identifier when the control bar overlaps the first index bar.

In accordance with one embodiment of the present disclosure, the controller may output only the second identifier on all the images corresponding to the first index bar and all the images corresponding to the second index bar when the first index bar moves to a position of the second index bar.

In accordance with one embodiment of the present disclosure, the controller may change arrangement positions of all the images corresponding to the first index bar or all the images corresponding to the second index bar according to a moved position of the first or second index bar.

In accordance with one embodiment of the present disclosure, the controller may automatically generate folders having different colors upon a reception of a user input for requesting for a generation of the folders with respect to images with the checkboxes having the different colors, and then automatically move or copy the images with the checkboxes having the different colors into the folders.

In accordance with one embodiment of the present disclosure, the controller may sort the folders according to an order of user preferences or colors.

In accordance with one embodiment of the present disclosure, the controller may merge the folders into one folder and output the one folder with the same color as the colors of the folders.

In accordance with one embodiment of the present disclosure, the controller may output checkboxes on the folders. The controller may automatically output all the images within first and second folders on a current screen and simultaneously automatically output checkboxes on all of the displayed images when the first and second folders are selected from the folders.

BRIEF DESCRIPTION OF DRAWINGS

FIG. 1A is a block diagram of a mobile terminal in accordance with the present disclosure.

FIGS. 1B and 1C are conceptual views of one example of the mobile terminal, viewed from different directions.

FIG. 2 is a flowchart illustrating sequential steps of a control method for a mobile terminal in accordance with embodiments disclosed herein.

FIG. 3 is an exemplary view of a control method for a mobile terminal in accordance with embodiments disclosed herein.

FIGS. 4A and 4B are exemplary views illustrating a method of managing (controlling) images using an index bar in accordance with embodiments disclosed herein.

FIGS. 5A to 5C are exemplary views illustrating another method of managing (controlling) images using an index bar in accordance with embodiments disclosed herein.

FIGS. 6A and 6B are exemplary views illustrating another method of managing (controlling) images using an index bar in accordance with embodiments disclosed herein.

FIGS. 7A and 7B are exemplary views illustrating a method of selecting an image section in accordance with embodiments disclosed herein.

FIGS. 8A and 8B are exemplary views illustrating another method of selecting an image section in accordance with embodiments disclosed herein.

FIG. 9 is an exemplary view illustrating a method of managing (controlling) images included in multiple image sections in accordance with embodiments disclosed herein.

FIGS. 10A and 10B are exemplary views illustrating a method of releasing an identifier in accordance with embodiments disclosed herein.

FIGS. 11A to 11C are exemplary views illustrating a method of inputting a tag to an index bar in accordance with embodiments disclosed herein.

FIGS. 12A to 12C are exemplary views illustrating a method of arranging (sorting) images in response to a movement of an index bar in accordance with embodiments disclosed herein.

FIGS. 13A and 13B are exemplary views illustrating a method of merging images in response to overlapping of index bars in accordance with embodiments disclosed herein.

FIGS. 14A to 14C are exemplary views illustrating a method of generating a folder including images having identifiers in accordance with embodiments disclosed herein.

FIGS. 15A and 15B are exemplary views illustrating a method of arranging (sorting) folders in accordance with embodiments disclosed herein.

FIGS. 16A to 16C are exemplary views illustrating a method of merging folders in accordance with embodiments disclosed herein.

FIGS. 17A to 17C are exemplary views illustrating a method of organizing folders in accordance with embodiments disclosed herein.

FIGS. 18A and 18B are exemplary views illustrating a method of moving or copying an image into a folder in accordance with embodiments disclosed herein.

BEST MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It may be understood that implementing all of the illustrated components is not a requirement, and that greater or fewer components may alternatively be implemented.

In more detail, the wireless communication unit 110 among those components may include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for inputting an image signal, a microphone 122 or an audio input unit for inputting an audio signal, and a user input unit 123 (for example, a touch key, a push key, and the like) for allowing a user to input information. Data (for example, audio, video, image, and the like) is obtained by the input unit 120 and may be analyzed and processed according to user commands.

The sensing unit 140 may be implemented using one or more sensors configured to sense internal information of the mobile terminal, the surrounding environment of the mobile terminal, user information, and the like. For example, the sensing unit 140 is shown having a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 may be configured to output various types of information, such as audio, video, tactile output, and the like. The output unit 150 may be shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIG. 1A according to the execution of an application program that have been stored in the memory 170. Also, the controller 180 may operate at least two components included in the mobile terminal in a combining manner to activate the application program.

The power supply unit 190 can be configured to receive external power or provide internal power, under the control of the controller, in order to supply appropriate power required for operating elements and components included in the mobile terminal 100. The power supply unit 190 may include a battery, and the battery may be configured to be embedded in the terminal body, or configured to be detachable from the terminal body.

At least some of those components may be combined for operation to implement an operation, a control or a control method of the mobile terminal according to various embodiments disclosed herein. Also, the operation, the control or the control method of the mobile terminal may be implemented on the mobile terminal by activating at least one application program stored in the memory 170.

Hereinafter, prior to describing various exemplary embodiments implemented by the mobile terminal 100, each of the aforementioned components will be described in more detail with reference to FIG. 1A.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), High Speed Uplink Packet Access (HSUPA), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If necessary, the location information module 115 may perform a function of another module of the wireless communication unit 110, in order to obtain data associated with a location of the mobile terminal in a replacing manner or an additional manner. The location information module 115 is a module used for acquiring a location (or a current location) of the mobile terminal, and may not be limited to a module which directly calculates or acquires the location of the mobile terminal.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 processes an external audio signal into electric audio data. The processed audio data may be utilized in various manners according to a currently-executed function (or a currently-executed application program) in the mobile terminal 100. Meanwhile, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element or a mechanical key (for example, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch (or touch input) applied to the touch screen, such as the display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 as a component of the input unit 120 typically includes at least one of a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, regarding the mobile terminal 100 as at least one assembly (or set), the terminal body may be understood as a conception referring to the assembly (or the set).

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 is shown having a display unit 151, first and second audio output modules 152a and 152b, a proximity sensor 141, an illumination sensor 142, an optical output module 154, first and second cameras 121a and 121b, first and second manipulation units 123a, 123b, a microphone 122, an interface unit 160, and the like.

Hereinafter, description will be given, as illustrated in FIGS. 1B and 1C, of an exemplary embodiment of a mobile terminal, in which the display unit 151, the first audio output module 152a, the proximity sensor 141, the illumination sensor 142, the optical output module 154, the first camera 121a and the first manipulation units 123a are disposed on a front surface of a terminal body, the second manipulation unit 123b, the microphone 122 and the interface unit 160 are disposed on a side surface of the terminal body, and the second audio output module 152b and the second camera 121b are disposed on a rear surface of the terminal body.

However, it is to be understood that alternative arrangements are possible and within the teachings of the instant disclosure. Some components may be omitted or re-arranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver to transfer voice audio to a user's ear, and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

The drawings illustrate an example that the first manipulation unit 123a is a touch key, but the present disclosure may not be limited to this. For example, the first manipulation unit 123a may be configured as a push key (or a mechanical key) or in combination of the touch key and the push key.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a communication system which is operable with the mobile terminal 100 according to the present disclosure will be described.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™ Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The computer may include the controller 180 of the mobile terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Hereinafter, embodiments associated with a control method which can be implemented in the mobile terminal having such configuration will be described with reference to the accompanying drawings. It is obvious to those skilled in the art that the present disclosure can be specified into other particular forms without departing from the spirit and essential features of the present disclosure.

The aforementioned mobile terminal 100 is configured to sense a touch input applied by a pen unit. The pen unit may be any of a stylus pen which can apply a touch input onto a touch screen, a wireless pen which can perform transmission and reception of wireless signals with the terminal, and the like. The wireless signal may be transmitted and received through ultrasonic waves, magnetic fields, infrared rays, and the like.

The display unit 151 may be provided with a touch sensor for sensing a touch input. Screen information output on the display unit 151 may include various types of graphic objects. Here, the graphic objects may be implemented in the form of image, text, icon and the like. A home screen page may also be referred to as an idle screen. When the terminal is in an idle state, the home screen page may be outputtable on the display unit 151. In more detail, icons of applications installed in the mobile terminal, folders in which the icons are stored, widget icons and the like may be displayed on the home screen page. Here, examples of the graphic objects may include icons (thumbnail images), folders and the like.

Hereinafter, description will be given of an apparatus and method for effectively managing (for example, moving, copying, editing, grouping, arranging, etc.) images by selecting those images in different manners. A mobile terminal and a control method thereof according to embodiments disclosed herein may be configured to provide identifiers to documents, icons of applications, emails, messages and the like as well as images (photos).

FIG. 2 is a flowchart illustrating sequential steps of a control method for a mobile terminal in accordance with embodiments disclosed herein.

First, the controller 180 displays a plurality of images (thumbnail images representing photos) on the display unit 151 in response to a user's request (S11). For example, the controller 180 displays images stored in an album (or a gallery) on the display unit 151 when a photo-related application is selected by the user.

When a touch input (for example, a short touch, a long touch, a touch input with a specific pattern, etc.) (or user's eyes, a user's gesture, etc) is applied to a first image among the plurality of images, the controller 180 displays a first identifier, which indicates the selection of the first image, on the first image (S12). For example, when a touch input is applied to the first image among the plurality of images, the controller 180 displays on the first image a first checkbox (color box) having a first color (for example, a blue color) to indicate that the first image has been selected. The first image may be at least one image.

The specific pattern may be set by a user. For example, the specific pattern may be set to forms of marks, such as a pattern of drawing a circle, a triangle, a rectangle and the like, a pattern of ticking off, a pattern of marking X, and the like. As another example, the specific pattern may be a pattern of writing text, such as writing an alphabet "I" on a graphic object.

As another example, the specific pattern may be set differently according to each control command. For example, the specific pattern may be a pattern drawn on a plane on which screen information is output on the display unit 151 (or an outer surface of a window covering a display device). Also, an end or start pattern may be a tap of tapping the display unit 151. When a touch input or gesture (for example, a short touch, a long touch, a touch input with a specific pattern, etc.) applied to a second image among the plurality of images is sensed, the controller 180 displays a second identifier, which indicates that the second image has been selected in a different selecting manner from the first image, on the second image (S13). For example, when the touch input is applied to the second image among the plurality of images, the controller 180 displays on the second image a second checkbox having a second color (for example, a red color) indicating that the second image has been selected in a different selecting manner from the first image. The second image may be at least one image.

The controller 180 may indicate that the second image has been selected according to a different method from the first image, in a manner of outputting a shape (form) such as a circle, a triangle, a rectangle, a star and the like, instead of the first and second colors, on the first and second checkboxes. For example, the controller 180 may indicate that the second image has been selected in the different manner from the first image, by outputting the circular shape (form) on the first checkbox and the star shape on the second checkbox. That is, the controller 180 may output the circular shape on the first checkbox so as for the user to recognize that the first image having the first checkbox has been selected as a first group, and output the star shape on the second checkbox so as for the user to recognize that the second image having the second checkbox has been selected as a second group.

FIG. 3 is an exemplary view illustrating identifiers output on images in accordance with embodiments disclosed herein.

As illustrated in FIG. 3, when a photo-related application is selected by a user, the controller 180 outputs a plurality of images within an album (or gallery) on the display unit 151.

The controller 180 outputs on the display unit 151 plural icons, such as a first icon 3-1 for selecting or releasing selection of all of the plurality of images, a second icon 3-2 for designating multiple sections to select an image from the plurality of images, and a second icon 3-3 (for example, checkboxes having different colors) for outputting a plurality of identifiers, which indicate that all the images within a first section and all the images within a second section of the multiple sections have been differently selected, along with the plurality of images. The checkboxes may have different colors (background colors) or different shapes (for example, a rectangular shape, a star shape, a circular shape, a triangular shape, various animal shape, various plant shapes, and the like).

When the user touches a first checkbox having a first color (for example, a red background color) among those checkboxes 3-3 having the plurality of colors, the controller 180 displays empty checkboxes 3-4 on the plurality of images. When the user touches a first image(s) (or an empty checkbox(es) output on the first image) among the plurality of images, the controller 180 outputs the first color (for example, the red background color) on the empty checkbox output on the first image and simultaneously ticks off the checkbox. That is, when the user touches the first checkbox having the first color among the checkboxes 3-3, which have the plurality of colors, and thereafter touches the first image, the controller 180 outputs a first checkbox 3-3a having the first color (for example, a red color) on the first image.

When the user touches the first checkbox 3-3a having the first color displayed on the first image or touches the first image including the first checkbox 3-3a having the first color, the controller 180 displays an empty checkbox, like a reference numeral 3-4, other than the first checkbox 3-3a, on the first image, so as to release the selection of the first image.

While the first checkbox 3-3a of the first image is in a ticked state, when the user touches the first checkbox 3-3a having the first color (for example, the red background color) among the checkboxes (i.e., the third icon) 3-3 having the plurality of colors, the controller 180 releases the tick-off of the first checkbox 3-3a of the first image.

When the user touches the second image (or an empty checkbox output on the second image) among the plurality of images after touching a second checkbox having a second color (for example, a yellow background color) among the checkboxes 3-3 having the plurality of colors, the controller 180 outputs the second color (for example, the yellow background color) on the empty checkbox output on the second image and simultaneously ticks off the checkbox. That is, when the user touches the second image after touching the second checkbox 3-3b having the second color among the checkboxes 3-3 having the plurality of colors, the controller 180 outputs the second checkbox 3-3b having the second color on the second image.

When the user touches the second checkbox 3-3b having the second color output on the second image or touches the second image including the second checkbox 3-3b having the second color, the controller 180 outputs an empty checkbox, like the reference numeral 3-4 (empty checkbox), instead of the second checkbox 3-3b, on the second image, so as to release the selection of the second image.

While the second checkbox 3-3b of the second image is in the ticked state, when the user touches the second checkbox 3-3b having the second color among the checkboxes 3-3 with the plurality of colors, the controller 180 releases the tick-off of the second checkbox 3-3b of the second image.

When the user touches a third image (or an empty checkbox output on the third image) among the plurality of images after touching a third checkbox having a third color (for example a blue background color) among the checkboxes (third icon) 3-3 having the plurality of colors, the controller 180 outputs the third color (for example, the blue background color) on the empty checkbox output on the third image and simultaneously ticks off the checkbox. That is, when the user touches the third image after touching the third checkbox having the third color among the checkboxes 3-3 with the plurality of colors, the controller 180 outputs a third checkbox 3-3c having the third color on the third image.

When the user touches the third checkbox 3-3c having the third color output on the third image or touches the third image including the third checkbox 3-3c having the third color, the controller 180 outputs an empty checkbox, like the reference numeral 3-4 (empty checkbox), instead of the third checkbox 3-3c, on the third image, so as to release the selection of the third image.

While the third checkbox 3-3c of the third image is in a ticked state, when the user touches the third checkbox 3-3c having the third color among the checkboxes 3-3 with the plurality of colors, the controller 180 releases the tick-off of the third checkbox 3-3c of the third image.

When a first section for selecting images from the plurality of images is designated, the controller 180 may output the first identifier (for example. 3-3a) on all the images within the first section. When a second section for selecting images from the plurality of images is designated, the controller 180 may output the second identifier (for example, 3-3b) on all the images within the second section. For example, when the user selects a first image (a start image (or an initial image) of a first section) and a fifth image (an end image (or a last image) of the first section) sequentially from the plurality of images after selecting the second icon 3-2 for designating multiple sections for the image selection, the controller 180 designates a section, in which all the images from the first image (the start image of the first section) to the fifth image (the end image of the first section) are included, as the first section.

The controller 180 automatically outputs a checkbox with an arbitrary color (for example, the first checkbox 3-3a with the first color) on all the images belonging to the first section.

When the user touches the second checkbox with the second color (for example, the yellow background color) among the checkboxes 3-3 with the plurality of colors, the controller 180 may also output the second checkbox with the second color (for example, the yellow background color) on all the images belonging to the first section.

The controller 180 may display on the display unit 151 a plurality of index bars 3-5a, 3-5b and 3-5c, which control (for example, copy, move, edit, arrange, group, input tags to, etc.) the images with the identifiers. For example, the controller 180 may display on the display unit 151 a first index bar 3-5a for controlling (for example, copying, moving, editing, arranging, grouping, inputting tags to, etc.) the first image with the first checkbox 3-3a, a second index bar 3-5b for controlling (for example, copying, moving, editing, arranging, grouping, inputting tags to, etc.) the second image with the second checkbox 3-3b, and a third second index bar 3-5c for controlling (for example, copying, moving, editing, arranging, grouping, inputting tags to, etc.) the third image with the third checkbox 3-3c.

FIGS. 4A and 4B are exemplary views illustrating a method of managing (controlling) images using an index bar in accordance with embodiments disclosed herein.

As illustrated in FIGS. 4A and 4B, when a predetermined touch pattern (for example, pinch-in touch) 4-1 is applied to the first index bar 3-5a for controlling (for example, copying, moving, editing, arranging, grouping, inputting tags to, etc.) the first image with the first checkbox 3-3a, the controller 180 groups the first image (at least one first image) with the first checkbox 3-3a into one folder (or album) 4-2. The controller 180 may represent (or set) a title (name) (for example, a winter vacation) of the folder (or album) 4-2 using a title (name) of the first image within the grouped folder (or album) 4-2, or set the title of the folder 4-2 according to a user input.

When a pinch-in touch is applied to the second index bar 3-5b for controlling (for example, copying, moving, editing, arranging, grouping, inputting tags to, etc.) the second image with the second checkbox 3-3b, the controller 180 groups the second image (at least one second image) with the second checkbox 3-3b into one folder (for album). The controller 180 may represent (or set) a title (name) (for example, a winter vacation) of the folder (or album) 4-2 using a title (name) of the second image within the grouped folder (or album) 4-2, or set the title of the folder 4-2 according to a user input.

When a preset touch pattern (for example, pinch-out touch) is applied to the first index bar 3-5a, the controller 180 releases the grouping with respect to the first image included in the folder (or album) 4-2.

When a preset touch pattern (for example, dragging to right) is applied the first index bar 3-5a for controlling (for example, copying, moving, editing, arranging, grouping, inputting tags to, etc.) the first image with the first checkbox 3-3a, the controller 180 simultaneously releases the tick-off of the first checkbox 3-3a output on the first image (at least one first image).

FIGS. 5A to 5C are exemplary views illustrating another method of managing (controlling) images using an index bar in accordance with embodiments disclosed herein.

As illustrated in FIGS. 5A and 5B, when a preset touch pattern (for example, dragging to left) 5-1 is applied to the first index bar 3-5a for controlling (for example, copying, moving, editing, arranging, grouping, inputting tags to, etc.) the first image with the first checkbox 3-3a, the controller 180 collects the first image (at least one first image) (first image in an initially-arranged state) with the first checkbox 3-3a, displays the collected first image 5-3 with the first checkbox 3-3a on a first edit window 5-2, and outputs the first index bar 3-5a adjacent to the first edit window 5-2. The first image 5-3 displayed on the first edit window 5-2 may be independently controlled (for example, copied, moved, edited, arranged, grouped, tag-received, etc.) according to a user input (for example, a user touch input, a user gesture, and the like).

When there are a plurality of first images 5-3 displayed on the first edit window 5-2, the controller 180 may change a length of the first index bar 3-5a, which is output adjacent to the first edit window 5-2, according to the number of first images 5-3. For example, the controller 180 changes the length of the first index bar 3-5a output adjacent to the first edit window 5-2 in proportion to the number of first images 5-3.

On the other hand, when a preset touch pattern (for example, dragging to right) is applied to the first index bar 3-5a output adjacent to the first edit window 5-2, the controller 180 restores the first image (the at least one first image) with the first checkbox 3-3a into the initially-arranged state.

As illustrated in FIG. 5C, when a preset touch pattern (for example, dragging to left) is applied to the second index bar 3-5b for controlling (for example, copying, moving, editing, arranging, grouping, inputting tags to, etc.) the second image with the second checkbox 3-3b, the controller 180 collects the second image (at least one second image) (second image in an initially-arranged state) with the second checkbox 3-3b, displays the collected second image 5-5 with the second checkbox 3-3b on a second edit window 5-4, and outputs the second index bar 3-5b adjacent to the second edit window 5-4.

On the other hand, when a preset touch pattern (for example, dragging to right) is applied to the second index bar 3-5b output adjacent to the second edit window 5-4, the controller 180 restores the second image (the at least one second image) with the second checkbox 3-3b to the initially-arranged state.

When a preset touch pattern (for example, dragging up to a left end of the display unit 151) is applied to the first index bar 3-5a for controlling (for example, copying, moving, editing, arranging, grouping, inputting tags to, etc.) the first image with the first checkbox 3-3a, the controller 180 collects the first image (at least one first image) (first image in an initially-arranged state) with the first checkbox 3-3a, sets the collected first image with the first checkbox 3-3a as a hidden file, and outputs the first index bar 3-5a with a preset color (for example, a semitransparent color) or a preset shape (for example, a triangular shape, a star shape, etc.).

On the other hand, when the first index bar 3-5a output with the preset color (for example, the semitransparent color) or in the preset shape (for example, the triangular shape, the star shape, etc.) is dragged to its initial position (for example, to the left end of the display unit 151), the controller 180 restores the first image (the at least one first image) with the first checkbox 3-3a, which has been set as the hidden file, to the initially-arranged state (releasing the hidden file setting).

When a preset touch pattern (for example, dragging up to a left end of the display unit 151) is applied to the first index 3-5a for controlling (for example, copying, moving, editing, arranging, grouping, inputting tags to, etc.) the first image with the first checkbox 3-3a, the controller 180 collects the first image (at least one first image) (first image in an initially-arranged state) with the first checkbox 3-3a, sets the collected first image with the first checkbox 3-3a as a hidden file, and outputs on the display unit 151 notification information (for example, icon, emoticon, symbol, character, etc.), which indicates that the first image has been set as the hidden file.

On the other hand, when a preset touch pattern is applied to the notification information or the first index bar 3-5a output with the preset color (for example, the semitransparent color) or in the preset shape (for example, the triangular shape, the star shape, etc.) is dragged to its initial position (for example, to the left end of the display unit 151), the controller 180 restores the first image (the at least one first image) with the first checkbox 3-3a, which has been set as the hidden file, to the initially-arranged state (releasing the hidden file setting).

FIGS. 6A and 6B are exemplary views illustrating another method of managing (controlling) images using an index bar in accordance with embodiments disclosed herein.

As illustrated in FIGS. 6A and 6B, when a preset touch pattern (for example, a long touch) is applied to the second index bar 3-3b for controlling the second image with the second checkbox 3-3b, the controller 180 searches for (i.e., an image-based search) an image (for example, a background image) from a plurality of images with the second checkbox 3-3b. Here, the searched image belongs to a different category from a category (for example, a portrait), to which the plurality of images with the second checkbox 3-3b belong. The controller 180 then outputs a popup window 6-1, which proposes to change the second checkbox 3-3b output on the searched image (for example, the background image) 6-1a.

The controller 180 may display the searched image 6-1a (for example, the background image) on the popup window 6-1, or further display notification information to notify that the searched image (for example, the background image) 6-1a belongs to the different category from the category (for example, the portrait) of the plurality of images with the second checkbox 3-3b.

When a preset touch pattern (for example, a long touch) is applied to the second index bar 3-5b for controlling the second image with the second checkbox 3-3b, the controller 180 may also propose the change of the second checkbox 3-3b output on the searched image (for example, the background image) 6-1a, and search for images 6-1b, which belong to the same category (for example, the portrait) as the category (for example, the portrait) of the plurality of images, from images with other checkboxes (for example, first and third checkboxes) other than the second checkbox 3-3b. The controller 180 may then output proposal information for proposing to change the checkboxes output on the searched images (for example, the portraits) 6-1b into the second checkbox 3-3b.

FIGS. 7A and 7B are exemplary views illustrating a method of selecting an image section in accordance with embodiments disclosed herein.

As illustrated in FIGS. 7A and 7B, when a user touches the second icon 3-2 for designating the multi-section for the image selection, the controller 180 displays guide information 7-1 such as "select a start image and an end image of a section."

When a first section for selecting images from the plurality of images is designated, the controller 180 may display the first identifier (for example, 3-3a) on all the images within the first section. When a second section for selecting images from the plurality of images is designated, the controller 180 may display the second identifier (for example, 3-3b) on all the images within the second section. For example, when the user selects a first image 7-2 (a start image of the first section) and a third image 7-3 (a last image of the first section) sequentially from the plurality of images after selecting the second icon 3-2 for designating the multi-section for the image selection, the controller 180 designates a section, which includes all the mages 7-4 from the first image 7-2 (the start image of the first section) to the third image 7-3 (the last image of the first section), as the first section.

The controller 180 automatically outputs a checkbox with a random color (for example, the first checkbox 3-3a with a first color) on all the images (the first to third images) included in the first section. When the user touches the first checkbox with the first color among checkboxes with plural colors, the controller 180 may display the first checkbox with the first color on all the images included in the first section.

While the first checkbox with the first color is output on all the images included in the first section, when the user touches the first checkbox with the first color among those checkboxes 3-3 (the third icon) with the plural colors, the controller 180 releases the tick-off of the first checkbox 3-3a of all the images included in the first section.

FIGS. 8A and 8B are exemplary views illustrating another method of selecting an image section in accordance with embodiments disclosed herein.

As illustrated in FIGS. 8A and 8B, when a new third section which includes some images (or all images) of the first section and some images (or all images) of the second section is designated, the controller 180 displays the third identifier on all the images within the third section. The first to third identifiers have different colors from each other.

For example, while the first checkbox 3-3a with the first color is displayed on all the images within the first section, when the user selects a first image 8-1 (a start image of the third section) and a seventh image 8-2 (a last (or end) image of the third section) sequentially from the plurality of images after selecting the second icon 3-2 for designating the multi-section for the image selection, the controller 180 designates a section, which includes all the images from the first image 8-1 (the start image of the third section) to the seventh image 8-2 (the last image of the third section), as the third section, and automatically displays a checkbox 8-3 with a new color (for example, a green color), instead of the first checkbox 3-3a with the first color, on all the images within the third section.

While the first checkbox 3-3a with the first color is output on all the images within the first section, when the user designates a fourth section, which includes all or part of images within the first section and images with an empty checkbox after selecting the second icon 3-2, the controller 180 may automatically display the first checkbox with the first color on all the images within the fourth section.

If it is assumed that there are a plurality of sections within the fourth section, the controller 180 may detect a checkbox with the most color (for example, a yellow color) among the plurality of sections, and automatically display the detected checkbox (for example, the checkbox which has ticked off and has the yellow color) on all the images within the fourth section.

FIG. 9 is an exemplary view illustrating a method of managing (controlling) images included in multiple image sections in accordance with embodiments disclosed herein.

As illustrated in FIG. 9, in a state where the first checkbox 3-3a with the first color is output on images within a first section 9-1, and the second checkbox 3-3b with the second color is output on images within a second section 9-2, when a specific image 9-3 among the images within the first section 9-1 is assumed to be also included in the second section 9-2, the controller 180 may output both the first checkbox 3-3a with the first color and the second checkbox 3-3b with the second color on the specific image 9-3 which is included in both of the first section 9-1 and the second section 9-2, so as to notify the user that the specific image 9-3 has been overlapped in multiple sections.

The controller 180 may also apply the first and second colors to the specific image 9-3 simultaneously with outputting the first checkbox 3-3a with the first color and the second checkbox 3-3b with the second color on the specific image 9-3. For example, the controller 180 may provide a gradation effect using the first and second colors to the specific image 9-3.

FIGS. 10A and 10B are exemplary views illustrating a method of releasing an identifier in accordance with embodiments disclosed herein.

As illustrated in FIGS. 10A and 10B, while checkboxes 10-a with plural colors are output on a plurality of images in a ticked state and checkboxes 10-2 without a color according to the related art are output on a plurality of images in a ticked state, when the user touches the first icon 3-1 for entire selection release, the controller 180 releases (10-1a and 10-2a) only the ticks of the checkboxes 10-1 with the plurality of colors and the checkboxes 10-2 without the color according to the related art, while maintaining the color (background color) of the checkboxes 10-1. On the other hand, when the user applies a preset touch pattern (for example, a long touch) to the first icon 3-1 for the entire section release, the controller 180 may delete all of the checkboxes 10-1 with the plurality of colors and the checkboxes 10-2 without the color according to the related art.

FIGS. 11A to 11C are exemplary views illustrating a method of inputting a tag onto an index bar in accordance with embodiments disclosed herein. The controller 180 displays an index bar, which corresponds to each checkbox, on the display unit 151 every time that each of the checkboxes is output.

As illustrated in FIGS. 11A and 11B, when a preset touch pattern (for example, dragging to left) is applied to the second index bar 3-5b, the controller 180 displays a tag input window 11-1 adjacent to the second index bar 3-5b. When the user input a tag (for example, last winter) on the tag input window 11-1, the controller 180 automatically inputs the tag (for example, the last winter) to all the images with the checkbox 3-3b with the second color, corresponding to the second index bar 3-5b.

As illustrated in FIG. 11C, when a preset touch pattern (for example, scroll input, dragging along a particular direction (for example, dragging to left or in a direction of 45°), etc) is applied to the second index bar 3-5b, the controller 180 outputs the tag (for example, the last winter) input to the tag input window 11-1 on the display unit 151.

The controller 180 may display a quick index bar (or a control bar) for controlling the plurality of index bars 3-5a, 3-5b and 3-5c on the display unit 151. For example, when the control bar overlaps the second index bar 3-5b, the controller 180 may display the tag (for example, the last winter) input to the tag input window 11-1 on the display unit 151. Or, when a part of the control bar overlaps the second index bar 3-5b, the controller 180 may display the tag (for example, the last winter) input to the tag input window 11-1 on the display unit 151.

FIGS. 12A to 12C are exemplary views illustrating a method of arranging (or sorting) images in response to a movement of an index bar in accordance with embodiments disclosed herein.

As illustrated in FIGS. 12A to 12C, when the quick index bar 12-1 (or the control bar) for controlling the plurality of index bars 3-5a, 3-5b and 3-5c overlaps the second index bar 3-5b in response to a user input, the controller 180 may arrange all the images with the checkbox 3-3b having the second color, corresponding to the second index bar 3-5b, on a current screen, and display the tag (for example, the last winter) input to the tag input window 11-1 of the second index bar 3-5b on the display unit 151.

When the quick index bar 12-1 (or the control bar) for controlling the plurality of index bars 3-5a, 3-5b and 3-5c overlaps the second index bar 3-5b, the controller 180 may move a screen to a position of the images with the checkbox 3-3b having the second color, corresponding to the second index bar 3-5b.

When the user changes a position of one (for example, the second index bar 3-5b) of the plurality of index bars 3-5a, 3-5b and 3-5c, the controller 180 may arrange all the images with the checkbox 3-3b having the second color (all of non-arranged (scattered) images with the checkbox 3-3b having the second color), corresponding to the second index bar 3-5b, based on the changed position.

The controller 180 may arrange images corresponding to the plurality of index bars 3-5a, 3-5b and 3-5c according to the arrangement order of the plurality of index bars 3-5a, 3-5b and 3-5c. For example, in case of an arrangement order of the first, third and second index bars 3-5a, 3-5c and 3-5b, the controller 180 may arrange the images in the order of the images corresponding to the first index bar 3-5a, the third images corresponding to the third index bar 3-5c, and the second images corresponding to the second index bar 3-5b.

FIGS. 13A and 13B are exemplary views illustrating a method of merging images in response to overlapping of index bars in accordance with embodiments disclosed herein.

As illustrated in FIGS. 13A and 13B, when the third index bar 3-5c among the plurality of index bars 3-5a, 3-5b and 3-5c overlaps (13-1) the second index bar 3-5b (i.e., when the third index bar 3-5c moves to the position of the second index bar 3-5b), the controller 180 displays the checkbox 3-3c with the third color, other than the checkbox 3-3b with the second color, on all the images corresponding to the second index bar 3-5b, so as to merge all the images corresponding to the second index bar 3-5b into all the images corresponding to the third index bar 3-5c. That is, when the third index bar 3-5c among the plurality of index bars 3-5a, 3-5b and 3-5c overlaps (13-1) the second index bar 3-5b (i.e., when the third index bar 3-5c moves to the position of the second index bar 3-5b), the controller 180 displays only the checkbox 3-3c with the third color on all the images corresponding to the second index bar 3-5b and all the images corresponding to the third index bar 3-5c.

When the third index bar 3-5c among the plurality of index bars 3-5a, 3-5b and 3-5c overlaps the second index bar 3-5b (i.e., when the third index bar 3-5c moves to the position of the second index bar 3-5b), the controller 180 may display an inquiry window 13-2 for inquiring whether or not to output only the checkbox 3-3c with the third color on all the images corresponding to the second index bar 3-5b and all the images corresponding to the third index bar 3-5c. When a confirmation key with respect to the inquiry window 13-2 is selected, the controller 180 may display only the checkbox 3-3c with the third color on all the images corresponding to the second index bar 3-5b and all the images corresponding to the third index bar 3-5c.

FIGS. 14A to 14C are exemplary views illustrating a method of generating a folder including images having identifiers in accordance with embodiments disclosed herein.

As illustrated in FIGS. 14A and 14B, in a state where the first checkbox 3-3a with the first color is output on all the images within the first section and the second checkbox 3-3b with the second color is output on all the images within second section, upon a reception of a user input (preset touch input or gesture) to request for generating a folder (or an album) with respect to all the images within the first section and/or all the images within the second section, the controller 180 displays an input window 14-1 for inputting a name of the folder (or the album) with respect to all the images within the first section and/or all the images within the second section. For example, the controller 180 may set a name of the folder (or the album) with respect to all the images with the first checkbox 3-3a by using the tag (for example, the winder vacation), by using a tag of one of every image with the first checkbox 3-3a, or by a user's direct input.

The controller 180 may immediately generate and display the folder (or the album) with respect to all the images within the first section and/or all the images within the second section, without displaying the input window 14-1.

As illustrated in FIG. 14C, in the state where the first checkbox 3-3a with the first color is output on all the images within the first section and the second checkbox 3-3b with the second color is output on all the images within the second section, upon a reception of a user input (preset touch input or gesture) to request for generating a folder (or an album) with respect to all the images within the first section and/or all the images within the second section, the controller 180 generates and displays folders (or albums) 14-2 and 14-3 with respect to all the images within the first section and/or all the images within the second section.

For example, in the state where the first checkbox 3-3a with the first color is output on all the images within the first section and the second checkbox 3-3b with the second color is output on all the images within the second section, upon a reception of a user input (preset touch input or gesture) to request for generating a folder (or an album) with respect to all the images within the first section, the controller 180 automatically generates the first folder 14-2 with the same color as the first color and automatically moves or copies all the images within the first section to the first folder 14-2.

In the state where the first checkbox 3-3*a* with the first color is output on all the images within the first section and the second checkbox 3-3*b* with the second color is output on all the images within the second section, upon a reception of a user input (preset touch input or gesture) to request for generating a folder (or an album) with respect to all the images within the second section, the controller 180 automatically generates the second folder 14-3 with the same color as the second color and automatically moves or copies all the images within the second section to the second folder 14-3.

FIGS. 15A and 15B are exemplary views illustrating a method of arranging (or sorting) folders in accordance with embodiments disclosed herein.

As illustrated in FIGS. 15A and 15B, the controller 180 may display a folder sort (album sort) menu 15-1 in response to a user request. When the user selects a favorite item from the folder sort (album sort) menu 15-1, the controller may preferentially sort user-favorite folders 15-2 and 15-3 among a plurality of folders. For example, when the user selects the favorite item from the folder sort (album sort) menu 15-1, the controller 180 arranges (sorts) the user-favorite folders 15-2 and 15-3 (in the order of the user's preference) of the plurality of folders on an upper end of a current screen. An icon 15-4 indicating a favorite folder may be output on the favorite folders 15-2 and 15-3.

The controller 180 may also sort the plurality of folders in a preset order when a color-based order item is selected by the user from the folder sort (album sort) menu 15-1.

When a date-based order item is selected by the user from the folder sort (album sort) menu 15-1, the controller 180 may also sort the plurality of folders in the order of date.

FIGS. 16A to 16C are exemplary views illustrating a method of merging folders in accordance with embodiments disclosed herein.

As illustrated in FIGS. 16A and 16B, when a folder merge (album merge) menu 16-1 is output in response to a user request. When the user selects a favorite folder (album) merge item from the folder merge (alum merge) menu 16-1, the controller 180 merges user-favorite folders 16-2*a* and 16-2*b* of the plurality of folders into one folder 16-4 and outputs the merged folder 16-4 on the display unit 151. The controller 180 may also display the folders 16-2*a* and 16-2*b* on the one folder 16-4 and output an icon indicating a favorite folder on the one folder 16-4.

As illustrated in FIG. 16C, when the folder merge (album merge) menu 16-1 is output in response to a user request and a same color folder merge item is selected by the user from the folder merge (album merge) menu 16-1, the controller 180 merges folders 16-3*a* and 16-3*b* having the same color among the plurality of folders into one folder 16-5, and outputs the merged folder 16-5 on the display unit 151. The controller 180 displays the folders 16-3*a* and 16-3*b* on the one folder 16-5, and outputs a color (background color) the one folder 16-5 as the same as the color (background color) of the folders 16-3*a* and 16-3*b*.

FIGS. 17A to 17C are exemplary views illustrating a method of organizing folders in accordance with embodiments disclosed herein.

As illustrated in FIGS. 17A to 17C, when a folder organize (album organize) menu is selected in response to a user request, the controller 180 displays a checkbox 17-1 (an empty checkbox) on each of a plurality of folders. When the user ticks off a checkbox of a first folder 17-2 and a checkbox of a second folder 17-3 among the plurality of folders, the controller 180 displays the first folder 17-2 and the second folder 17-3 on a first display region of a current screen. The controller 180 may then automatically display all the images 17-4 within the first folder 17-2 and the second folder 17-3 on a second display region of the current screen and simultaneously displays a checkbox (empty checkbox) on each of all of the displayed images 17-4, such that the user can select a desired image in an easy, fast manner.

FIGS. 18A and 18B are exemplary views illustrating a method of moving or copying an image into a folder in accordance with embodiments disclosed herein.

As illustrated in FIGS. 18A and 18B, in the state where all of the images 17-4 within the first folder 17-2 and the second folder 17-3 are automatically displayed on the second display region of the current screen and simultaneously the checkbox (the empty checkbox) is output on each of all of the displayed images 17-4, when a new folder 18-1 is generated in response to a user request and a specific section including specific images of the entire images 17-4 is designated, the controller 180 automatically moves or copies the specific images into the new folder 18-1. The controller 180 may move or copy the specific images of the specific section into the new folder 18-1 when a move or copy key is selected by the user.

The controller 180 may share the specific images of the entire images 17-4 in a manner of transmitting the specific images to a social networking service (SNS), an adjacent terminal, a server and the like according to a user request.

The configuration and method of the aforementioned embodiments may not be limitedly applied, but all or part of those embodiments will be selectively combined to achieve various modifications and variations.

The invention claimed is:

1. A mobile terminal comprising:
    a hardware display to display a plurality of contents; and
    a controller to display a first identifier on a first content among the plurality of contents, the first identifier indicating that the first content has been selected, and display a second identifier on a second content among the plurality of contents, the second identifier indicating that the second content has been selected in a different manner from the first content,
    wherein the controller:
    outputs a first index bar that controls the first content having the first identifier,
    outputs a second index bar that controls the second content having the second identifier,
    searches for at least one content belonging to a category different from a first category, among content with the first identifier, wherein the first category is defined by a majority of contents having the first identifier, and
    outputs information which proposes to change the first identifier displayed on the searched at least one content.

2. The mobile terminal of claim 1, wherein the first and second identifiers are checkboxes having different colors or shapes, and the plurality of contents are a plurality of images.

3. The mobile terminal of claim 2, wherein the controller outputs on a first image a first checkbox with a first color indicating that the first image has been selected from the plurality of images, and outputs on a second image a second checkbox with a second color indicating that the second image has been selected from the plurality of images in a different manner from the first image, wherein the first and second colors are different from each other.

4. The mobile terminal of claim 2, wherein the controller outputs the first identifier on all the images within a first section when the first section is designated, the first section being designated for selecting an image from the plurality of images, and outputs the second identifier on all the images within a second section when the second section is designated, the second section being designated for selecting an image from the plurality of images.

5. The mobile terminal of claim 4, wherein the controller outputs a third identifier on all the images within a third section when the third section is designated, the third section including a part of the first section or a part of the second section, wherein the first to third identifiers have different colors from one another.

6. The mobile terminal of claim 4, wherein the controller outputs both the first identifier and the second identifier on a specific image included in both of the first section and the second section.

7. The mobile terminal of claim 2, wherein the controller outputs, along with the plurality of images, on the display:
- a first icon for selecting all of the plurality of images or releasing all of the plurality of images selected;
- a second icon for designating a plurality of sections for selecting images from the plurality of images; and
- a third icon for outputting identifiers indicating that all the images within the first section and all the images within the second section of the plurality of sections have been selected in different manners from each other.

8. The mobile terminal of claim 1, wherein the controller executes one of grouping, setting as a hidden file, copying, moving, outputting on an edit window and sorting, with respect to a plurality of images each having the first identifier when a first touch input is applied to the first index bar.

9. The mobile terminal of claim 1, wherein the controller simultaneously releases the selection of a plurality of images each having the first identifier when a first touch input is applied to the first index bar.

10. The mobile terminal of claim 1, wherein the controller outputs a tag input window for inputting a tag to all the images having the first identifier on the display when a preset touch input is applied to the first index bar, and then automatically inputs the input tag to all the images with the first identifier when the tag is input onto the tag input window.

11. The mobile terminal of claim 1, wherein the controller outputs a control bar for controlling the first and second index bars on the display, and sorts all the images each having the first identifier when the control bar overlaps the first index bar.

12. The mobile terminal of claim 1, wherein the controller outputs only the second identifier on all the images corresponding to the first index bar and all the images corresponding to the second index bar when the first index bar moves to a position of the second index bar.

13. The mobile terminal of claim 1, wherein the controller changes arrangement positions of all the images corresponding to the first index bar or all the images corresponding to the second index bar according to a moved position of the first or second index bar.

14. The mobile terminal of claim 2, wherein the controller automatically generates folders having different colors upon a reception of a user input for requesting for a generation of the folders with respect to images with the checkboxes having the different colors, and then automatically moves or copies the images with the checkboxes having the different colors into the folders.

15. The mobile terminal of claim 14, wherein the controller sorts the folders according to an order of user preferences or colors.

16. The mobile terminal of claim 14, wherein the controller outputs checkboxes on the folders, wherein the controller automatically outputs all the images within first and second folders on a current screen and simultaneously automatically outputs checkboxes on all of the displayed images when the first and second folders are selected from the folders.

* * * * *